United States Patent
Rogmann

Patent Number: 6,074,452
Date of Patent: Jun. 13, 2000

[54] METHOD OF FERTILIZING A LAWN

[76] Inventor: Heiner Rogmann, Bahnhofstrasse 32, D-47625 Kevelaer, Germany

[21] Appl. No.: 09/086,853

[22] Filed: May 29, 1998

[30] Foreign Application Priority Data

May 31, 1997 [DE] Germany ............... 197 22 869

[51] Int. Cl.$^7$ ................................. C05C 11/00
[52] U.S. Cl. ................... 71/27; 71/26; 71/64.1
[58] Field of Search .............. 71/11–30, 26, 71/27, 64.1; 47/DIG. 6, 58

[56] References Cited

U.S. PATENT DOCUMENTS

| | | | |
|---|---|---|---|
| 2,117,087 | 5/1938 | Formhals | 71/22 |
| 3,669,357 | 6/1972 | Overbey. | |
| 4,291,497 | 9/1981 | Manankov | 47/58 |
| 5,549,729 | 8/1996 | Yamashita | 71/26 |
| 5,597,400 | 1/1997 | Nonomura et al. | 71/28 |
| 5,840,656 | 11/1998 | Kinnersley et al. | 504/115 |

FOREIGN PATENT DOCUMENTS

| | | |
|---|---|---|
| 1 110 265 | 10/1995 | China. |
| 0 161 395 | 2/1985 | European Pat. Off.. |

OTHER PUBLICATIONS

Derwent Abstract XP–002098112 corresponding to JP 850110644 dated May 23, 1985 and JP61270289 dated Nov. 29, 1996.

*Primary Examiner*—Wayne Langel
*Attorney, Agent, or Firm*—Collard & Roe P.C.

[57] ABSTRACT

A method of fertilizing a lawn which is located at least partially in the shade, comprises the step of applying to the leaves of the grass plants of the lawn a liquid fertilizer containing plant assimilates.

2 Claims, No Drawings

METHOD OF FERTILIZING A LAWN

BACKGROUND OF THE INVENTION

1. Field of the Invention

The present invention relates to a method of fertilizing a lawn which is located at least partially in the shade, which comprises the step of applying a liquid fertilizer to the leaves of the grass plants of the lawn.

2. Description of the Prior Art

The conventional fertilization of grass plants is based on supplying to the lawn such nutrients as nitrogen, phosphate and potassium. Applying nitrogen-containing fertilizers to the grass plants supplies to the grass plants nitrogen in the form of nitrate ($NO_3-$) or ammonium ($NH_4-$). The application of phosphate- and potassium-containing fertilizers supplies to the grass plants phosphate ($P_2O_5$) and potash ($K_2O$). The nutrients may be applied to the leaves or the roots of the grass plants.

Through photosynthesis, these nutrients are converted in the grass plants from an inorganic to an organic form. The inorganic form of the nutrients is the form which is poorer in energy while the organic form is richer in energy. The energy-richer forms of the nutrients, which have been converted from the energy-poorer form by photosynthesis and are called plant assimilates, are needed by the plants for the formation of leaves and roots.

At which point of the plants the assimilates are primarily needed depends, on the one hand, on the internal growth factors of the plant, i.e. their genetic make-up, and, on the other hand, on the external growth factors of the plant, i.e. the supply of water, such energy sources as light and heat, and nutrients.

It is known that lack of light will enhance the growth of grass blades while it will proportionally reduce the growth of grass roots. This is controlled by the concentration of nutrients in the grass plants, such as nitrate, and of assimilates, for example saccharose, amino acids and proteins. The higher the concentration of nutrients in the plant, the higher the plant's consumption of assimilates for forming leaves. The higher the concentration of assimilates in the plant, the higher the plant's tendency to form roots in order to absorb nutrients.

Since lawns are regularly cut, the mass of grass leaves is constantly reduced. The reduction of the mass of grass leaves correspondingly reduces the surface area of the grass leaves, which accordingly reduces the photosynthesis. This causes the absorption of light by the grass plants to be considerably limited. Under optimal soil conditions, the plants will adapt the mass of the roots to the produced rate of the assimilates of the mass of the leaves when the lawn is cut regularly.

When the lawn is located in the shade, i.e. an area relatively deprived of light, the ratio of the mass of leaves to the mass of roots is changed. The less light energy the grass leaves can absorb, the less nutrient salts, such as nitrate, may be converted by photosynthesis into plant assimilates. This results in a change of the equilibrium of nutrients and assimilates in the plants. The concentration of nutrients in the plants rises while the concentration of plant assimilates is lowered. This causes the plants to produce a larger mass of leaves to convert the high concentration of nutrients by the photosynthesis occurring in the leaves into the assimilates needed by the plants. In this process, the plants need the available assimilates for the production of the leaves while the growth or roots is neglected in proportion to the lack of light.

On the other hand, if the lawn receives a lot of light for the photosynthesis and the supply of nutrients to the grass plants is sufficient, which causes the equilibrium to change slightly in favor of the assimilates, the grass plants will use the assimilates primarily for the formation of roots.

The carrying capacity of a lawn used for sport activities, such as a baseball or football field, depends to a large extent on the root formation of the grass plants. If the root system of the lawn is weak, sport activities will rapidly damage the lawn. One reason for weak grass roots is a lack of light.

Known fertilizers and fertilization systems supply the nutrients required for photosynthesis to the roots or the blades of the grass plants.

SUMMARY OF THE INVENTION

It is the primary object of this invention to provide a lawn fertilization or feeding which will assure a good root formation even if the lawn is located in the shade so that, for example, the lawn may be used for sports activities, causing the lawn to be subject to heavy loads.

The above and other objects are accomplished according to the invention by applying to the leaves of the grass plants of the lawn a liquid fertilizer containing plant assimilates.

This produces a lawn in which the plant assimilates, which are missing because of the weakly proceeding photosynthesis, are supplied directly to the grass blades. This means that a lawn in the shade grows in the same way as a lawn in full sunlight and is able to carry out an usual photosynthesis. Lawns fertilized by the present method will not be subject to bare spots even when they are exposed to sports activities, such as baseball, soccer or football.

The plant assimilates penetrate the grass plants by diffusion through the leaves and are immediately available there for the formation of cells and of the masses of leaves and roots. The disequilibrium between nutrients and assimilates, due to the lack of light, is effectively overcome.

The plant assimilates preferably consist essentially of a preponderate amount of saccharose and another ingredient selected from the group consisting of proteins, amino acids, and a mixture of proteins and amino acids.

Furthermore, the plant assimilates are preferably dissolved in water and are applied to the leaves of the grass plants in a formulated medium.

DETAILED DESCRIPTION OF PREFERRED EMBODIMENTS

The following examples illustrate now preferred embodiments of this invention:

EXAMPLE 1

An amount of 100 kg of dextrose and 1 kg of sugar surfactant was mixed with 700 liters of water to provide a spraying fertilizing liquid. This liquid was uniformly sprayed over a lawn area of 8000 sq.m. This application was repeated at an average of once after every two times the lawn was mowed to cut the grass from a height of about 6 cm to 8 cm to a height of 4 cm to 5 cm.

This concentration of dextrose in the liquid fertilizer has proved to be preferred for grass plants having an average need of assimilates. This need depends on climatic conditions, such as the prevailing amount of heat, light and the like. If these climatic conditions change, the dextrose concentration in the liquid fertilizer must be accordingly increased or reduced, i.e. if there is more sunlight, the concentration may be accordingly reduced.

EXAMPLE 2

An amount of 50 kg of an amino acid adapted to the grass plants and 1 kg of sugar surfactant was mixed with 700 liters of water to provide a spraying fertilizing liquid. This liquid was applied to the lawn in the manner described in Example 1.

This concentration of amino acid in the liquid fertilizer has proved to be preferred for grass plants having an average need of assimilates. It may be changed in accordance with changing climatic conditions, as indicated in Example 1.

Useful amino acids are such amino acids that are obtained from grass-seed.

EXAMPLE 3

Example 1 was repeated but the amount of assimilates in the liquid fertilizer was changed to 70 kg of dextrose and 30 kg of amino acid.

What is claimed is:

1. A method of fertilizing a lawn which is located at least partially in the shade, which comprises the step of applying to the leaves of the grass plants of the lawn a liquid fertilizer containing plant assimilates consisting essentially of a preponderate amount of saccharose and another ingredient selected from the group consisting of proteins, amino acids, and a mixture of proteins and amino acids;

wherein the weight ration between the saccharose and the other ingredient is in the range of 100:1 to 70:30.

2. The method of claim 1, wherein the plant assimilates are dissolved in water and are applied to the leaves of the grass plants in a formulated medium.

* * * * *